US010592526B2

(12) United States Patent
Cheung et al.

(10) Patent No.: US 10,592,526 B2
(45) Date of Patent: *Mar. 17, 2020

(54) MULTI-VIEW CONTROL ON DATA SET

(71) Applicant: Microsoft Technology Licensing, LLC, Redmond, WA (US)

(72) Inventors: Chairy Cheung, Redmond, WA (US); Taurean Jones, Issaquah, WA (US); Euan Peter Garden, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/283,190

(22) Filed: Sep. 30, 2016

(65) Prior Publication Data

US 2018/0095625 A1 Apr. 5, 2018

(51) Int. Cl.
*G06F 3/0484* (2013.01)
*G06F 16/26* (2019.01)

(52) U.S. Cl.
CPC .................................. *G06F 16/26* (2019.01)

(58) Field of Classification Search
CPC ....... G06F 3/0484; G06F 3/0482; G06F 17/24
See application file for complete search history.

(56) References Cited

U.S. PATENT DOCUMENTS

| | | | |
|---|---|---|---|
| 7,373,605 B2 | 5/2008 | Schaper | |
| 7,882,440 B2 | 2/2011 | Mohr | |
| 7,908,555 B2 | 3/2011 | Zellner | |
| 8,040,360 B2 | 10/2011 | Louch | |
| 8,117,557 B2 | 2/2012 | Dotson et al. | |
| 9,056,539 B2 | 6/2015 | Mirza et al. | |
| 2004/0252074 A1* | 12/2004 | Schaper | G06F 3/1431 345/1.1 |

(Continued)

FOREIGN PATENT DOCUMENTS

WO     2014181318 A1     11/2014

OTHER PUBLICATIONS

Basu, Saikat, "Easily View Multiple Tabs at Once with These Chrome Extensions", Published on: Oct. 2, 2013 Available at: http://www.makeuseof.com/tag/easily-view-multiple-tabs-at-once-with-these-chrome-extensions/.

(Continued)

*Primary Examiner* — Seth A Silverman
(74) *Attorney, Agent, or Firm* — Workman Nydegger

(57) ABSTRACT

A user interface that includes components that each provide a view on the underlying data set, and also provide controls for editing or preparing the data set. The user interface components include a detail user interface component that displays a detail view on the data set, and summary user interface component(s) that each display a corresponding summary view on the data set. A promotion control promotes a summary view on the data set to a detailed view on the data set, and corresponding changes the controls usable in the promoted detail view. This allows the user to have a wide variety of views on the data set, and corresponding controls appropriate for that view. Thus, the user can take the most efficient and intuitive approach to editing or preparing the data, thereby allowing data preparation to be more efficient, intuitive and likely correct.

18 Claims, 17 Drawing Sheets

(56) References Cited

U.S. PATENT DOCUMENTS

| | | | |
|---|---|---|---|
| 2007/0100992 A1 | 5/2007 | Wong et al. | |
| 2009/0319944 A1 | 12/2009 | Chikkegowda et al. | |
| 2013/0328913 A1 | 12/2013 | Nassar | |
| 2014/0152541 A1* | 6/2014 | Murarka | G06F 3/0488 345/156 |
| 2014/0232723 A1* | 8/2014 | Jain | G06T 11/206 345/440 |
| 2015/0347711 A1* | 12/2015 | Soli | H04W 4/90 705/3 |
| 2016/0224532 A1* | 8/2016 | Miller | G06F 17/245 |

OTHER PUBLICATIONS

"OS X: How to use multiple displays with your Mac in Mountain Lion and earlier", Published on: Jan. 27, 2015 Available at: https://support.apple.com/en-in/HT202351.

"Multiple view controllers on screen at once?", Retrieved on: Jul. 8, 2016 Available at: http://stackoverflow.com/questions/2423858/multiple-view-controllers-on-screen-at-once.

"Non Final Office Action Issued in U.S. Appl. No. 15/283,193", dated Jul. 19, 2018, 33 Pages.

"Non Final Office Action Issued in U.S. Appl. No. 15/283,193", dated Apr. 19, 2019, 39 Pages.

Customguide, "Excel 2016 Training", Retrieved from https://web.archive.org/web/20160302091419/http://www.customguide.com:80/excel-2016-training/formula-errors-courseware, Mar. 2, 2016, 3 Pages.

Harvey, Greg, "Microsoft Excel 2010 All-In-One for Dummies", Retrieved from https://capdtron.files.wordpress.com/2014/03/excel-2010-all-in-one-for-dummies.pdf, 2010, 795 Pages.

"Final Office Action Issued in U.S. Appl. No. 15/283,193", dated Dec. 13, 2018, 34 Pages.

"Formula Basics", Retrieved From: https://web.archive.org/web/20160322215108/http://www.customguide.com/excel-2016-training/formula-basics, Retrieved on: Mar. 22, 2016, 3 Pages.

"Formula Errors", Retrieved From: https://web.archive.org/web/20160302091419/http://www.customguide.com/excel-2016-training/formula-errors-courseware, Retrieved on: Mar. 2, 2016, 4 Pages.

"Final Office Action Issued in U.S. Appl. No. 15/283,193", dated Aug. 9, 2019, 49 Pages.

* cited by examiner

*Figure 7*

MULTI-VIEW CONTROL ON DATA SET

BACKGROUND

In the information age, it is important to be able to efficiently and effectively evaluate data. There exists a variety of software programs that are capable of providing a variety of views on a variety of data sets. In order to most effectively process and evaluate some data sets, it is helpful to prepare the data for most effective and efficient use. For instance, data may be prepared by removing redundant data from the data set, removing undesired fields from the data set, reformatting fields of the data set, combining fields of the data set, filtering the data set, and so forth. By evaluating a more compact and relevant data set, the experience of analyzing the data set may be improved and made more efficient.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Properly prepared data sets provide significant advantages to those programs for which the data set is prepared. However, it is not an easy task to efficiently and correctly prepare a data set. It is not easy to have an understanding and context for what data should be removed, which fields are most relevant, what formats are best, and so forth. It is easy to make a mistake in preparing the data, leading to potential inefficiencies and inaccuracies in the data itself. The principles described herein provide a user interface that allows for fine-grained and intuitive control over the preparation data, thereby allowing for more efficient and accurate preparation of the data.

The principles described herein provide a user interface that includes multiple components that each provide a view on the underlying data set, and also provide controls for editing or preparing the data set. The user interface components include a detail user interface component that displays a detail view on the data set, and one or more summary user interface components that each display a corresponding summary view on the data set. There is also a control that promotes a summary view on the data set to a detailed view on the data set, and corresponding changes the controls usable in the promoted detail view. This allows the user to have a wide variety of views on the data set, and corresponding controls appropriate for that view. Thus, the user can take the most efficient and intuitive approach to editing or preparing the data, thereby allowing data preparation to be more efficient, intuitive and likely correct.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 6 through 18 illustrated a more specific example user interface and is used as a walkthrough to show various features consistent with the principles described herein;

FIG. 6 illustrates an initial user interface showing various views of a data set after an eighth stage of preparation;

FIG. 7 illustrates a user interface which shows how the user interface of FIG. 6 changes if the user uses the navigation pane to navigate to the fourth stage of the data preparation—a filtering stage;

FIG. 8 illustrates a user interface which shows how the user interface of FIG. 7 changes if the user uses the navigation pane to navigate to the fifth stage of the data preparation, which is converting the selected values to numeric values;

FIG. 9 illustrates a user interface which shows how the user interface of FIG. 8 changes if the user uses the navigation pane to navigate to the sixth stage of preparation—a filtering stage;

FIG. 10 illustrates a user interface which shows how the user interface of FIG. 9 changes if the user uses the navigation page to navigate through the seventh stage (another filtering stage) and to the eighth stage of preparation—a conversion of the selected field type to numeric;

FIG. 11 illustrates a user interface which shows how the user interface of FIG. 10 changes if the user uses the navigation pane to navigate to the ninth stage of operation, which again converts field types to a numeric field type, causing the underlying data set to change, which change propagates through all views, just as in all other stages;

FIG. 12 illustrates a user interface which shows how the user interface of FIG. 11 changes if the user uses the navigation pane to navigate to the eleventh stage of operation, which again converts field types to a numeric field type (after having added a column by example in the tenth stage), causing the underlying data set to change, which change propagates through all views, just as in all other stages;

FIG. 13 illustrates a user interface which shows what happens if the user promotes the histogram view in FIG. 12;

FIG. 14 illustrates a user interface that shows that the user may use the promoted view to select a different portion of the data set to perform an operation on, even though this is a prior stage of data preparation;

FIG. 15 illustrates the user interface after this filtering has been performed, which caused changes to the content to the data statistics view and the column statistics view, and caused the three entries (the top three) in the value count view corresponding to the selected bar to be highlighted;

FIG. 16 illustrates the user interface after the user selects another bar of the bar chart view, causing a new detail popup to appear;

FIG. 17 illustrates the user interface of FIG. 16 when the user selects another portion of the data set; and FIG. 18 illustrates the user interface of FIG. 17 when navigating back one stage.

DETAILED DESCRIPTION

Properly prepared data sets provide significant advantages to those programs for which the data set is prepared. However, it is not an easy task to efficiently and correctly prepare a data set. It is not easy to have an understanding and context for what data should be removed, which fields are most relevant, what formats are best, and so forth. It is easy to make a mistake in preparing the data, leading to potential inefficiencies and inaccuracies in the data itself. The principles described herein provide a user interface that allows for fine-grained and intuitive control over the preparation data, thereby allowing for more efficient and accurate preparation of the data.

The principles described herein provide a user interface that includes multiple components that each provide a view on the underlying data set, and also provide controls for editing or preparing the data set. The user interface components include a detail user interface component that displays a detail view on the data set, and one or more summary user interface components that each display a corresponding summary view on the data set. There is also a control that promotes a summary view on the data set to a detailed view on the data set, and corresponding changes the controls usable in the promoted detail view. This allows the user to have a wide variety of views on the data set, and corresponding controls appropriate for that view. Thus, the user can take the most efficient and intuitive approach to editing or preparing the data, thereby allowing data preparation to be more efficient, intuitive and likely correct.

Because the user interface is provided by a computing system on a display of the computing system, a computing system will first be described with respect to FIG. 1. Then, the user interface in accordance with the principles described herein, and the underlying computing technology that causes that user interface to be presented, will be described with respect to FIGS. 2 through 18.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
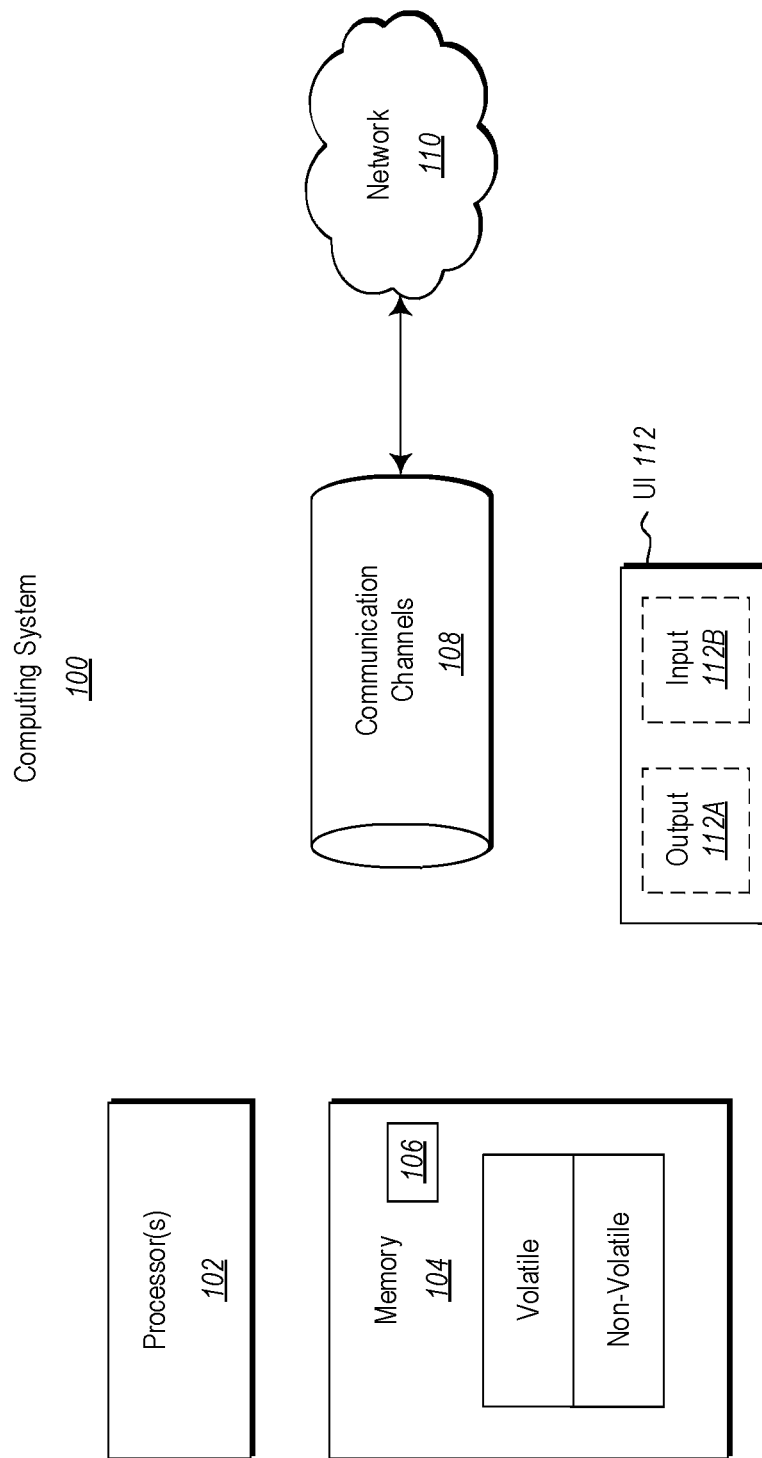
FIG. 1 illustrates a computing system in which the principles described herein may operate.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality, and so forth. Examples of input mechanisms 112B might include, for instance, microphones, touchscreens, holograms, virtual reality controls, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS").

The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
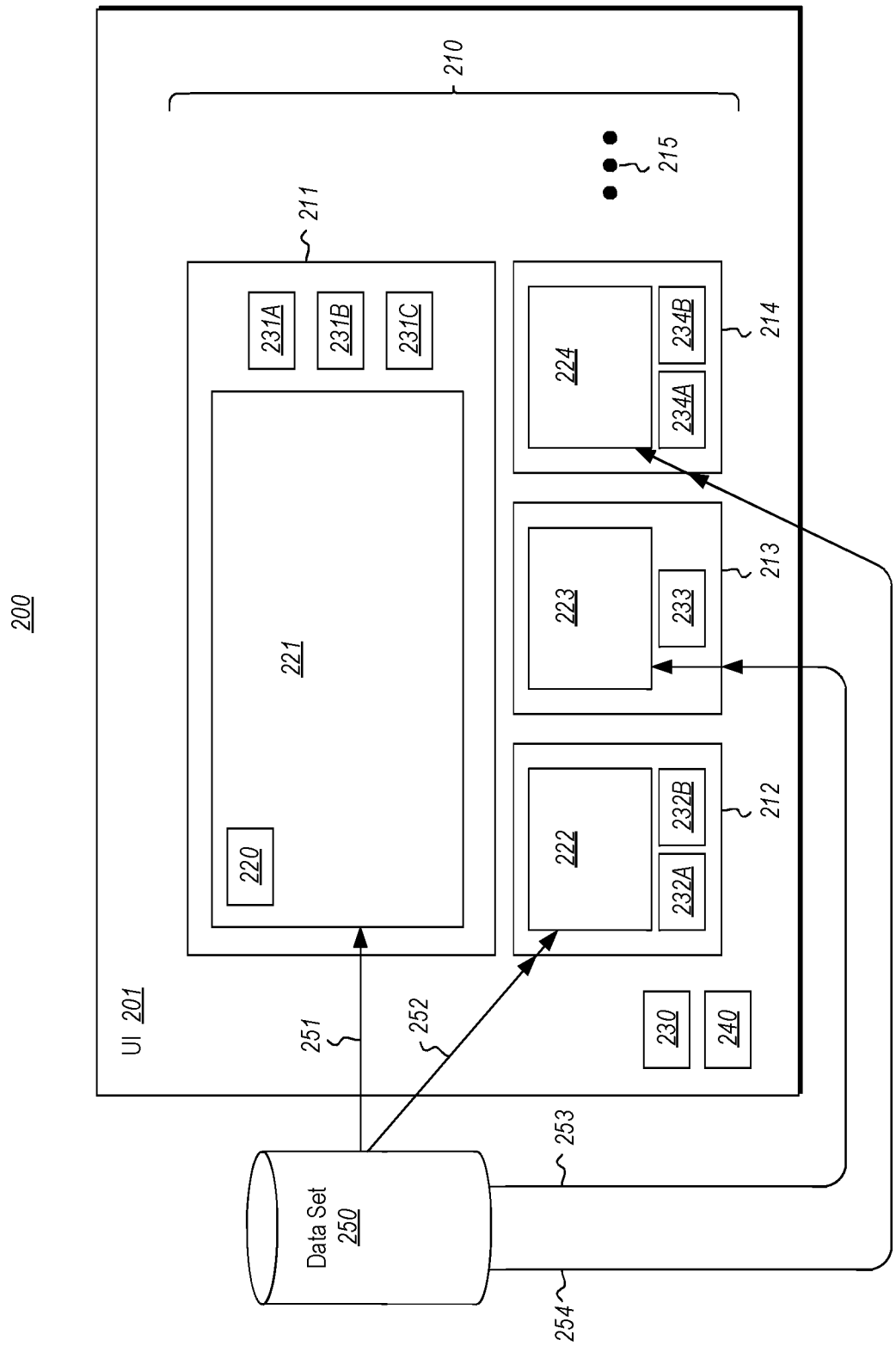
FIG. 2 illustrates a user interface environment that displays a user interface that has multiple components that provide distinct views on underlying data sets, each view having controls for editing the data.

FIG. 2 illustrates a user interface environment 200 that displays a user interface 201. As an example, the user interface environment 200 might be a display for displaying the user interface 201, as well as one or more input devices for interfacing with controls of the user interface 201. If the user interface environment 200 were operated with the computing system 100 of FIG. 1, the display might be, for example, one of the output mechanisms 112A described above. In that case, the input devices might be one of the input mechanisms 112B described above. The precise input and output mechanisms for interfacing with the user interface 201 are not important to the broader principles described herein.

The user interface 201 displays multiple user interface components 210 including a detail user interface component 211 and three summary user interface components 212, 213 and 214. Although the principles described herein are not limited to the number of summary user interface components (as represented by ellipses 215), there are three summary user interface components 212, 213 and 214 illustrated within FIG. 2. As represented by ellipses 215, there may be as few as zero summary interface components, all the way up to perhaps very many summary interface components. In one user experience, summary user interfaces may be opened and closed in response to events (such as user interaction), and thus the number of available summary user interface components may vary over time.

The layout of the user interface components 210 within the user interface 201 is for purposes of example only. The principles described operate regardless of where the user interface components are laid out, and their precise shape and size. Furthermore, the principles described herein are not limited to providing any particular view on any particular data set. The principles described herein operate just as well regardless of the detail and summary view types being shown, and regardless of the data in the data set. However, in order to allow the detail user interface component 211 to provide a more detailed view, the detail user interface component 211 may be larger than the summary user interface components.

Each of the user interface components 211 through 214 provides a corresponding different view 221 through 224 of the underlying data set 250 (as represented by respective arrows 251 through 254). The detail user interface component 211 displays the detail view 221 on the data set. The summary user interface components 212 through 214 each display a corresponding summary view 222 through 224, respectively, of the data set 250.

In one embodiment, there is a selection control 220 that allows the user to select a portion of the data set 250. For instance, the selection control 220 might allow the user to select a set of one or more tables, rows, and/or columns of the data set 250, if the data set 250 has a table-like structure. In some embodiments, the summary views express aggregated information regarding the selected portion of the data set 250 that is selected by the selection control 220.

Each of the user interface components 210 has one or more controls that may be used to change the data set 250. For instance, the detail user interface component 211 is illustrated as including three controls 231A, 231B, and 231C that are used to change the data set 250 (as compared to the selection control 220 which is used for selecting data of the data set 250). The summary user interface component 212 is illustrated as including controls 232A and 232B for changing the data set 250. The summary user interface component 213 is illustrated as including control 233 for changing the data set 250. Lastly, the summary user interface component 214 is illustrated as including controls 234A and 234B for editing the data set 250.

Such controls may be suitable for editing and/or preparing of the data set 250. As an example, the controls may be used to remove data that is not of interest, such as redundant data, or information that is simply not relevant to the consumer of the data set 250. Alternatively, or in addition, the controls may be used to change the format of the data. For instance, strings may be converted to numbers; dates of one format may be changed to another, the data may be sorted by certain field values, and so forth.

The type of preparation that is enabled by a particular control may be based on the type of information that is most intuitively expressed by the corresponding view that includes that particular control. Accordingly, the number of controls illustrated with respect to a user interface component may be different depending on the type of data preparation that is most intuitively accessed from that particular control. Thus, the precise number of controls illustrated in FIG. 2 should be seen as just an example.

Accordingly, the user that wishes to edit the data set 250 may dive into that editing in the way that is most intuitive for that user, given that there are multiple ways to edit the data set 250. Furthermore, once the user edits the data set 250, the effect of that change may be propagated to each view (as also represented by the arrows 251 through 254). For instance, suppose that detailed view shows a raw table view of the data set 250. Such a view might allow a user to more intuitively select a value, and remove all portions of the data that are associated with that value. This, in turn, might have an effect on a statistical summary view in which the statistics of that value were being displayed.

The user interface 201 also includes a promotion control 230 that, when activated, promotes a summary view on the data set being displayed in a summary user interface component to a detail view displayed in the detail user interface component 211. Although this promotion control 230 is illustrated as being outside of any of the summary user interface components 212 through 214, some embodiments include a promotion control 230 for each of the summary user interface components 212 through 214 for easier selection of which summary view to promote.

The promotion causes a change in the set of one or more controls usable in the promoted detail view. In some embodiments, the promotion of the summary view merely causes the prior detailed view to be covered up by the newly promoted detailed view. Alternatively, or in addition, the promotion of the summary view causes the prior detailed view to occupy a summary user interface component. Accordingly, the promotion may cause a change in the set of one or more controls usable in the new summary view as the prior detailed view is now in summarized form.

In some embodiments, the promotion of a summary view to a detail view may be made dependent, at least in part, on the type of summary view. For instance, summary views of one type may be promoted into detailed views of a predetermined type. Summary views of another type may be promoted into detailed views of another predetermined type. In other cases, the type of detailed view that a summary view may be promoted into may be a result of a more complex determination that involves a number of factors.

Likewise, the summarization of a detail view to a summary view may also be made dependent, at least in part, on the type of detail view. For instance, detail views of one type may be summarized into summarized views of a predetermined type. Detailed views of another type may be summarized into summary views of another predetermined type. In other cases, the type of summary view that a detail view may be summarized into may be a result of a more complex determination that involves a number of factors.

Such factors may include user configuration, or the history of the user or a collection of users. For instance, if it is determined that when a summary view of a particular type is promoted, users in general tend to change the detailed view almost immediately into another view type, then the system change the promotion rules so as to tend more towards promoting directly into that historically preferred type.

As previously mentioned, the promotion of a summary view to a detail view may change the characteristics of the controls that are associated with that view and which are used to edit the underlying data set. Likewise, the summarization of a detail view to a summary view may likewise change the characteristics of the controls that are associated with that view and which are used to edit the underlying data. The controls may be changed in such a way as to be provide more intuitive preparation controls given the changed view. Thus, as views change, the edit and preparation controls remain matched to type of information conveyed in the view, and allow for control based on that visible information as edit parameters.

Figure 3:
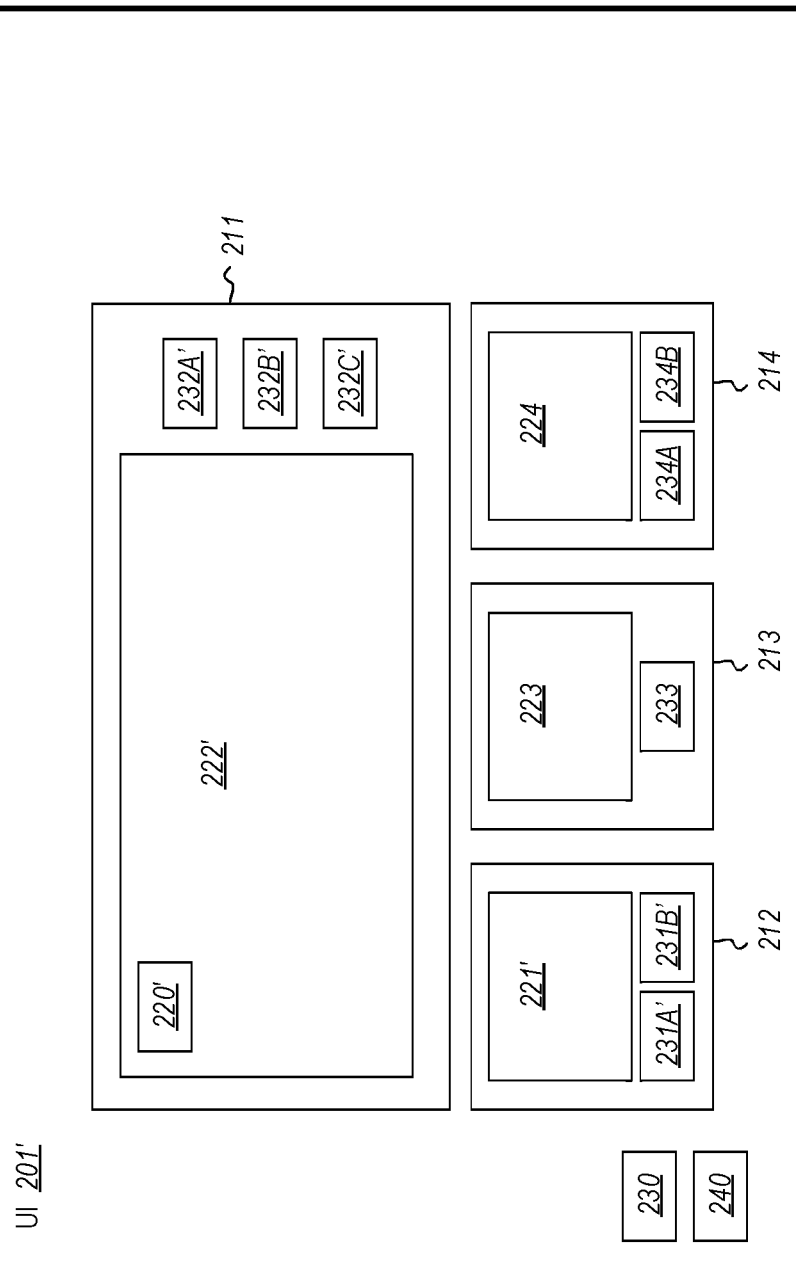
FIG. 3 illustrates the user interface of FIG. 2 after the promotion control is executed to promote a summary view to the detailed view, and after summarization of the detail view into a summary view.

FIG. 3 illustrates the user interface 201' of FIG. 2 after the promotion control is executed to promote summary view 222 to the detailed view 222', and after summarization of the detail view 221 into a summary view 221'. This switching may have been accomplished by the user activating the promotion control 230 with respect to the prior summary view 222. Now, the detail view 222' that was promoted from the summary view 222 appears in the detail user interface component 211. Furthermore, the summarized view 221' that was summarized from the detailed view 221 appears in a summary user interface component 222.

The summary views 223 and 224 stayed the same during this example switching process illustrated from FIG. 2 to FIG. 3. Accordingly, the corresponding edit and preparation controls 233 and 234A and 234B likewise remained the same. However, the controls for the detailed view 222' are now different from what they were for the prior summary view 222. For instance, the controls are no longer 232A and 232B, but are now different controls 232A', 232B' and 232C perhaps being more appropriate controls for preparing the data around the information now displayed in the new detail view 222'. Furthermore, the controls for the new summary view 221' are now different from what they were for the prior detail view 221. For instance, the controls are no longer 231A, 231B and 231C; but are now different controls 231A' and 231B' again perhaps being more appropriate controls for preparing the data around the information now displayed in the new summary view 221'.

Figure 4:
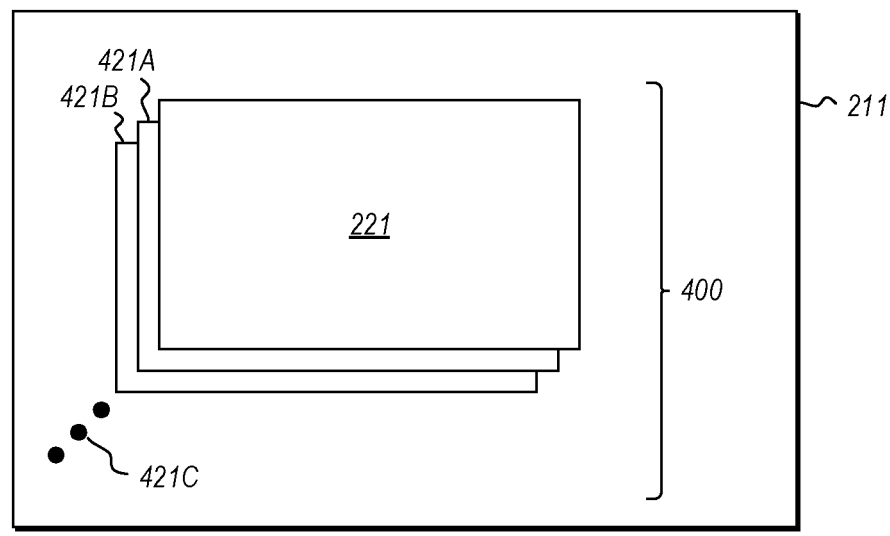
FIG. 4 illustrates a stacking of views in the detail user interface component in which the visible detail view is merely the top of a stack of other detail views.

The detail view 221 displayed in the detail user interface component 211 may actually be stacked with one or more other detail views, where only the top detail view is visible. For instance, FIG. 4 illustrates a stacking 400 of views in the detail user interface component 211 in which the detail view 221 is merely the top of a stack of other detail views including detail view 421A and 421B. The ellipses 421C represent that this stack may be of any depth and may change dynamically as detail views are removed from the stack. Likewise, the summary view displayed in any of the summary user interface components may likewise be stacked with one or more other summary views.

A control 240 may be used for exposing on top of the detailed user interface component a detail view that was not previously on top of that stack. As an example, the most recently accessed detail view may automatically be placed on top of the detail user interface component. Thus, the control 240 may be more of a detail view access control. The control 240 might alternatively be a minimize control that minimizes a detail view that was on the top of the detail user interface component to expose an immediately underlying detail view in the detail user interface component. The control 240 might be a close control that closes the detail view that was on top of the detail user interface component to expose an immediately underlying detail view in the detail user interface component.

However, the control 240 may also be a navigation control that causes the detail view to show the detail view state as it existed at a prior stage in altering the data set. This navigation may also cause the summary views to likewise show their summary views on the data set as it existed at that prior stage. The control 240 might also include an undo control for undoing the alteration of the data set to return the data set itself to the prior stage navigated to with the navigation control. When navigating to a prior stage in altering the data set, the selection control 220 may remain fully capable of selecting a different portion of the data set as it then existed at that prior stage, thereby potentially changing what is shown in the summary views at least for those summary views that summarize only the selected portion of the detailed view.

Figure 5:
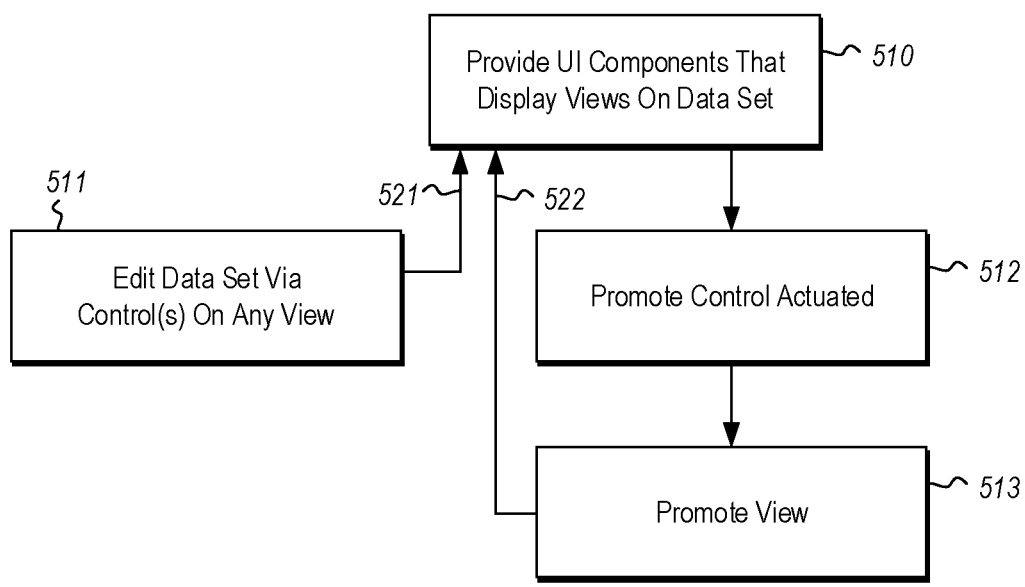
FIG. 5 illustrates a flowchart of a method for causing a user interface to be displayed on a display of a computing system.

FIG. 5 illustrates a flowchart of a method 500 for causing a user interface to be displayed on a display of a computing system. While much of the flow of the method 500 has been described already, it will be made more explicit with respect to FIG. 5. First, multiple user interface components are displayed such that each user interface component displays a different view on a data set (act 510). An example, of such user interface components are illustrated in FIG. 2. Then, one of two things could happen.

One thing is that the data set could be altered (act 511) in response to detection of user interaction with any of the controls that edit or prepare the data, regardless of which user interface component that control appears in. There is no limit to the number of times (zero or more or many) that this editing of act 511 may be repeated (as represented by arrow 521). Another possibility is that the promotion control is selected for promoting a summary view to a detailed view (act 512). An example of such a control is the control 230 of FIG. 4. In response, the summary view is promoted to a detailed view (act 513). For instance, as previously described, the user interface 201 of FIG. 2 might alter to the user interface 201' of FIG. 3. There is again no limit on the number of times this promotion operation may be performed (as represented by the arrow 522).

Figure 6:
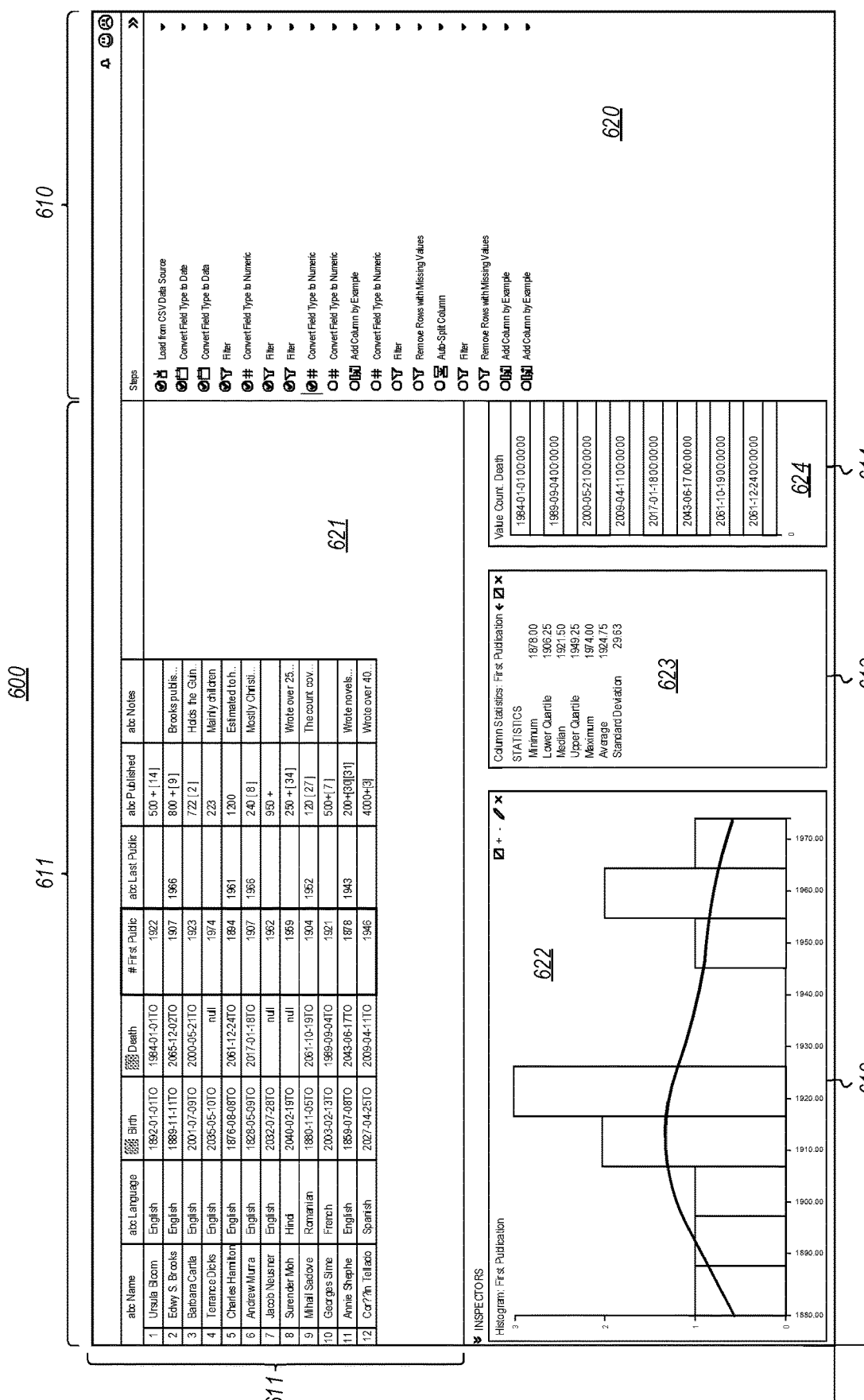

Having now described the broad principles with respect to FIGS. 2 through 5, a specific user interface example and flow will be described with respect to FIGS. 6 through 18. FIG. 6 illustrates a user interface 600, which includes a navigation user interface component 620, and four view user interface components 621 through 624.

The navigation pane 620 illustrates a stage of the alteration of the underlying data set that is being viewed within the view user interface components 621 through 624. In the state of FIG. 6, the data is in its eighth (of eighteen) stage of preparation. Completed stages are identified. Furthermore, in the case that the data preparation goes through predetermined stages, the remaining stages are also illustrated, but shown as not yet performed. Alternatively, perhaps all eighteen stages have been previously performed, but the user has navigated back to the views on the data set as the data existed after the eighth stage.

As the data is edited, a stage is added to the navigation pane 620; or, if the data preparation stages are predetermined, then the stage is marked as complete. The navigation pane 620 represents an example of the control 240 of FIG. 2. The navigation pane 620 may also be used to navigate to a prior stage in editing of the data. For instance, in FIG. 6, if there are eighteen completed stages, the user could navigate to any of the completed eighteen stages to show views on the data as its existed at that stage. In FIG. 6, the user has navigated to the eighth stage, in which stage the selected field was changed to a numeric format.

The user interface component 611 shows the detail view 621, which is at this stage a grid view of a table that lists various prolific authors. The column selected includes values of the year that the author first published. The summary user interface components 612, 613 and 614 shows various summary views on the selected year of death. In this grid view, the column headers show a header title including (from left to right) Name, Language, Birth, Death, First Public (meaning First Publication), Last Public (meaning Last Publication), Published and Notes. The headers each include a prefix that identifies the types of the values in that column. An "abc" prefix denotes that the column includes string values. A "#" prefix denotes that the column includes numeric values. A desk calendar icon is used as a prefix to denote that the column includes date values.

Summary user interface component 612 shows a summary view 622 in the form of a histogram plotting (using bars), the year on the horizontal axis, and the number of authors first publishing in that year on the vertical axis. Summary user interface component 613 shows a column statistics view 623 that shows statistics for the column including the minimum value, the lower quartile threshold value, the median value, the upper quartile threshold value, the maximum value, the average value, and the standard deviation of the values of the selected column of the detail value. Summary user interface component 614 shows a value count view 624 for the column entitled "Death", which is not selected in FIG. 6, but which includes the date of death for each author, and no value if there is no date of death.

Figure 7:
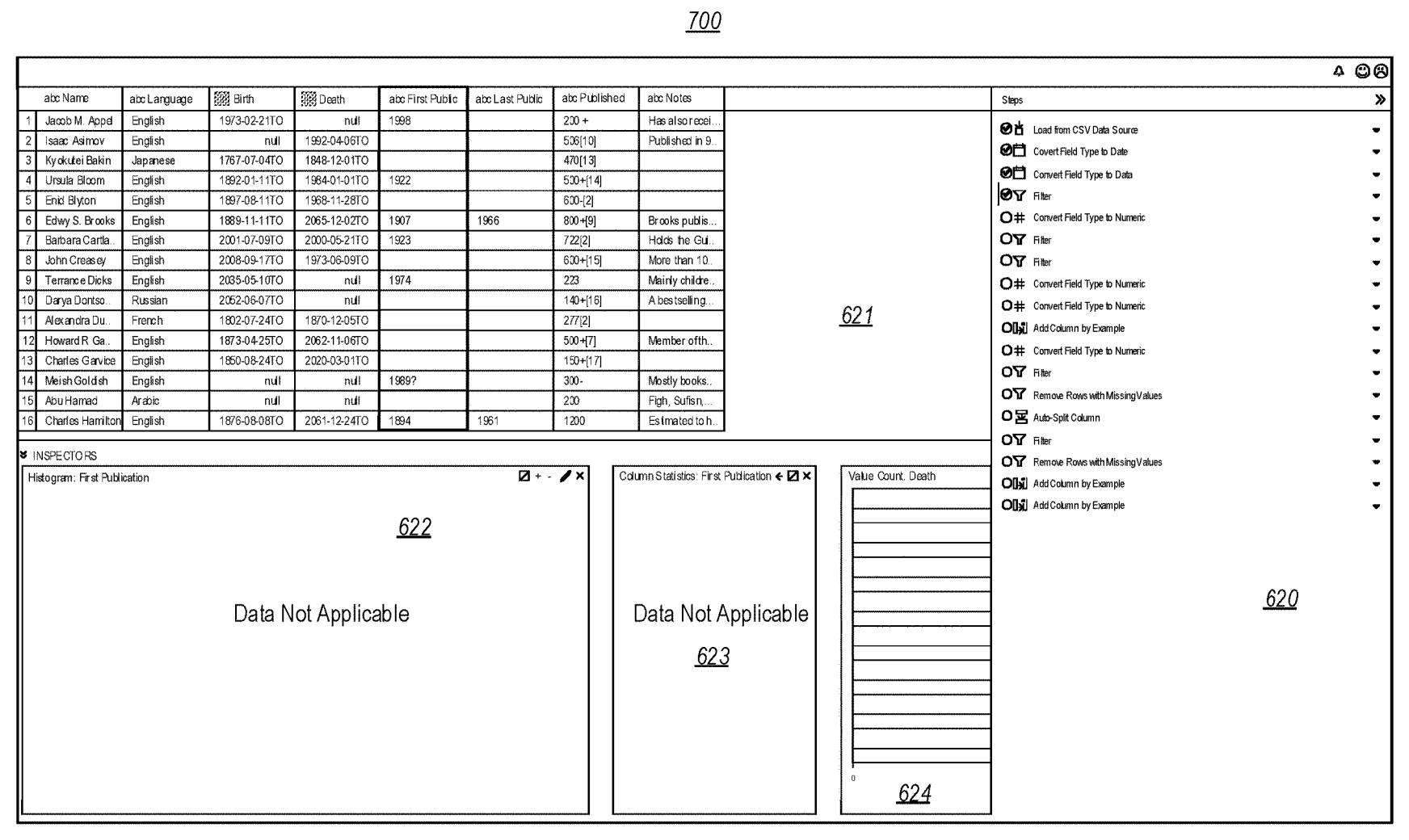

FIG. 7 illustrates a user interface 700 which shows how the user interface 600 of FIG. 6 changes if the user uses the navigation pane 620 to navigate to the fourth stage of the data preparation a filtering stage. The data displayed in the detailed view 621 is changed somewhat so as to show the data as its existed after that fourth stage. Note that the histogram user interface component 622 has no data since the histogram consumes numeric values, and the values of the selected column are still strings, and are not converted to numeric values until the fifth stage. The statistics user interface component 623 likewise is shown blank for the same reason. The Value Count user interface component 624 is shown as unfilled also because the values from the "Death" column still need filtering (in the seventh stage) before those fields can be populated.

Figure 8:
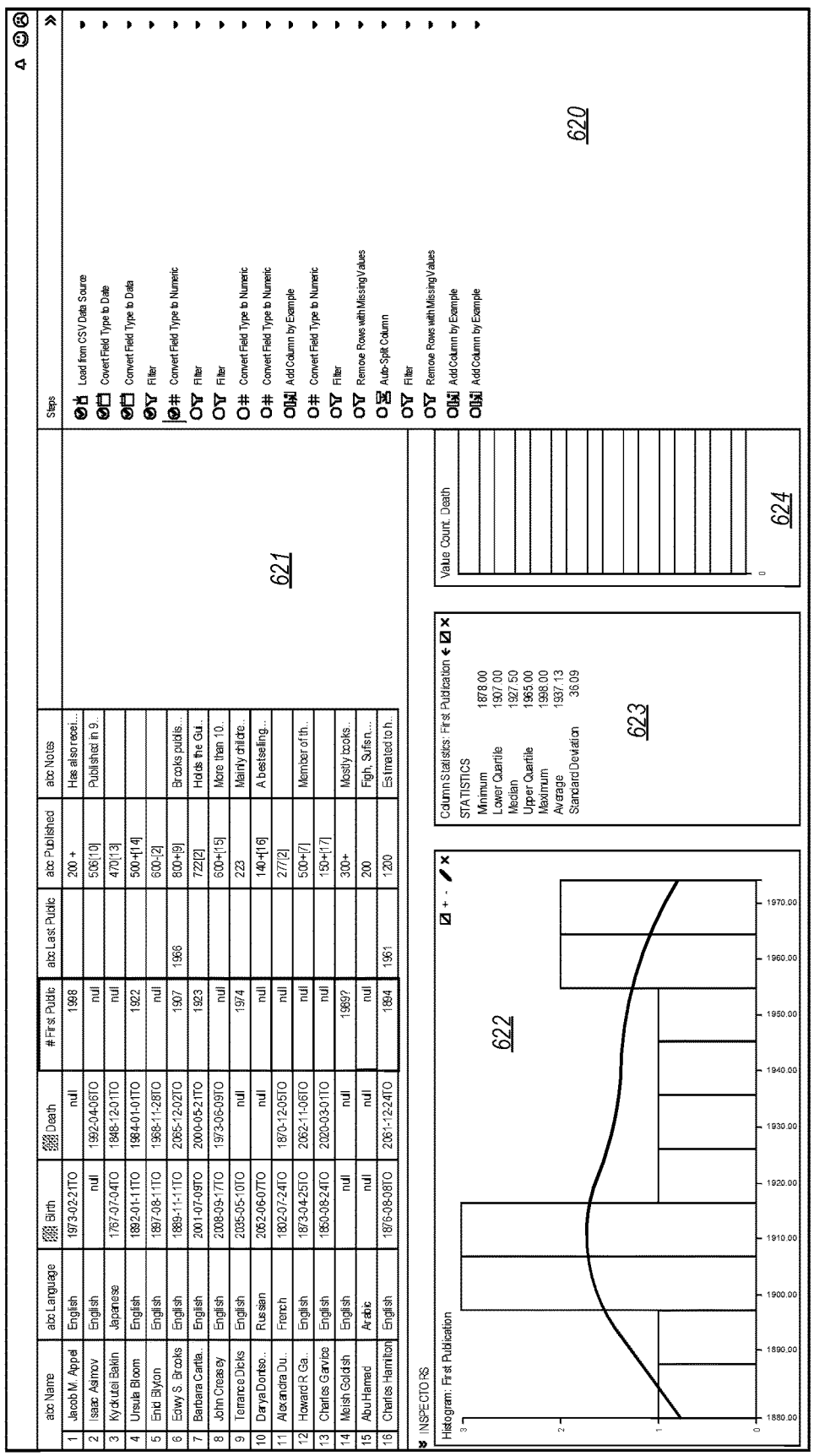

FIG. 8 illustrates a user interface 800 which shows how the user interface 700 of FIG. 7 changes if the user uses the navigation pane 620 to navigate to the fifth stage of the data preparation, which converts the selected values to numeric values. This conversion allows the histogram user interface component 622 and the statistics user interface component 623 to now be filled with meaningful summary information (i.e., a histogram and statistics, respectively) of the selected column, because the selected First Public column now includes numeric values. The fifth stage has not caused the view of the value count user interface component 624 to change.

Figure 9:
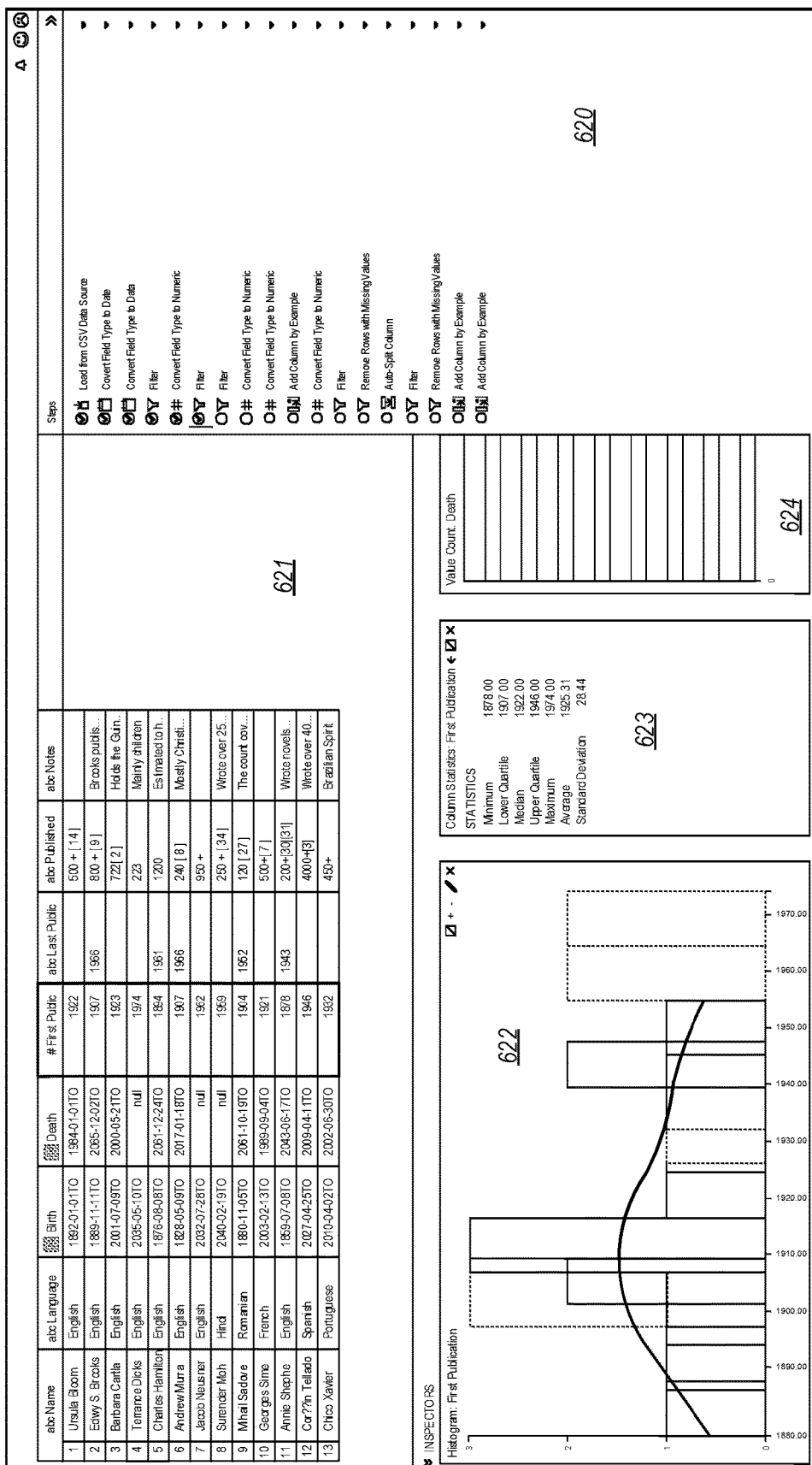

FIG. 9 illustrates the user interface 900 which shows how the user interface 800 of FIG. 8 changes if the user uses the navigation pane 620 to navigate to the sixth stage of preparation a filtering stage. The histogram user interface shows a before (perhaps gray, but represented with dashed lines) and after (perhaps blue but represented as solid lines) view of what the histogram would look like upon performing the filter operation. The filtering has also changed the statistics displayed in the statistics user interface component 623. The sixth stage has not caused the view of the value count user interface component 624 to change.

Figure 10:
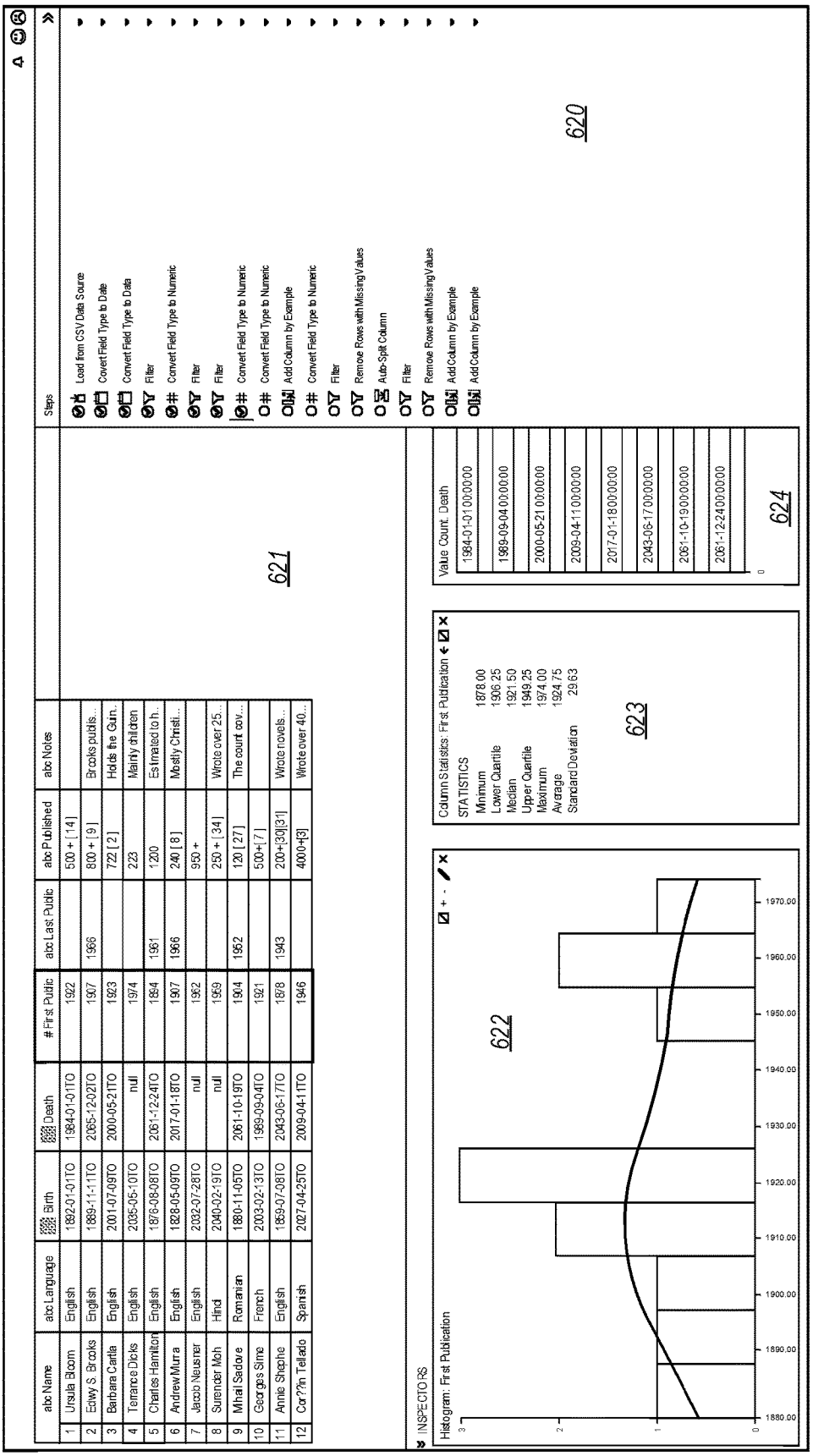

FIG. 10 illustrates the user interface 1000 which shows how the user interface 900 of FIG. 9 changes if the user uses the navigation page 620 to navigate through the seventh stage (another filtering stage) and to the eighth stage of preparation a conversion of the selected field type to numeric. This filtering and conversion operations causes some changes to the content of the histogram user interface component 622, the statistics user interface component 623, and has now allowed the value count user interface component 624 to be populated.

Figure 11:
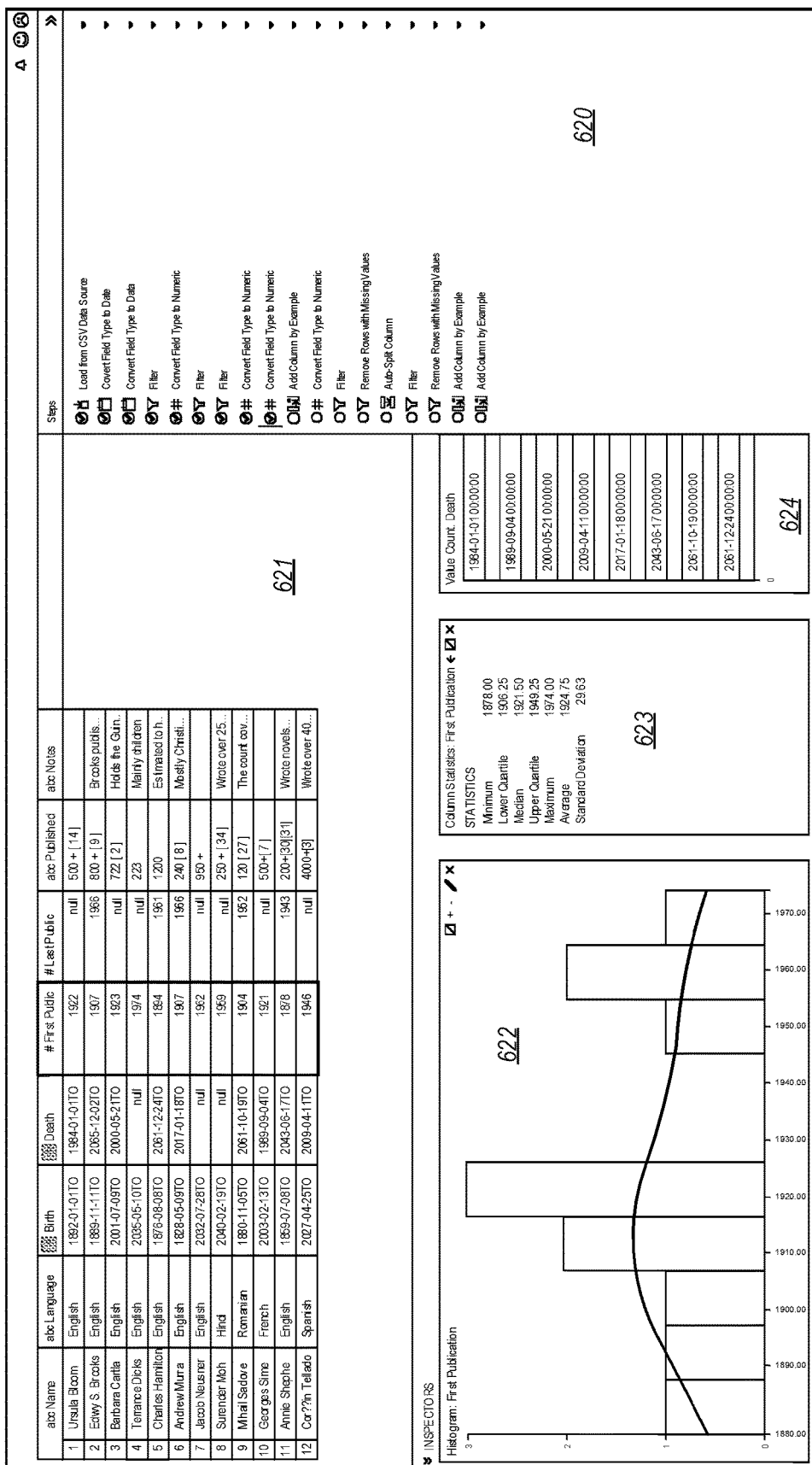

FIG. 11 illustrates the user interface 1100 which shows how the user interface 1000 of FIG. 10 changes if the user uses the navigation pane 620 to navigate to the ninth stage of operation, which again converts field types to a numeric field type, causing the underlying data set to change, which change propagates through all views, just as in all other stages.

Figure 12:
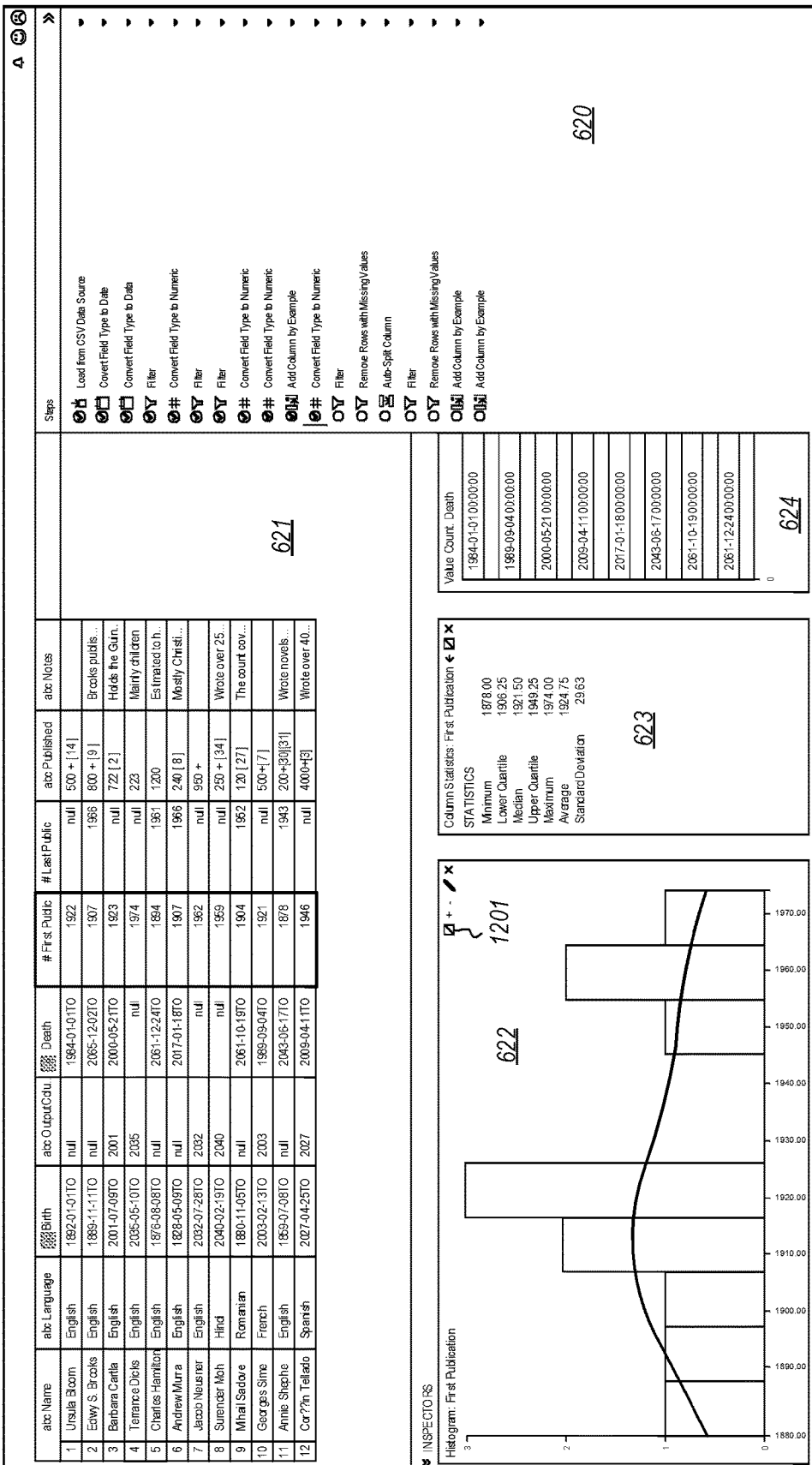
Figure 13:
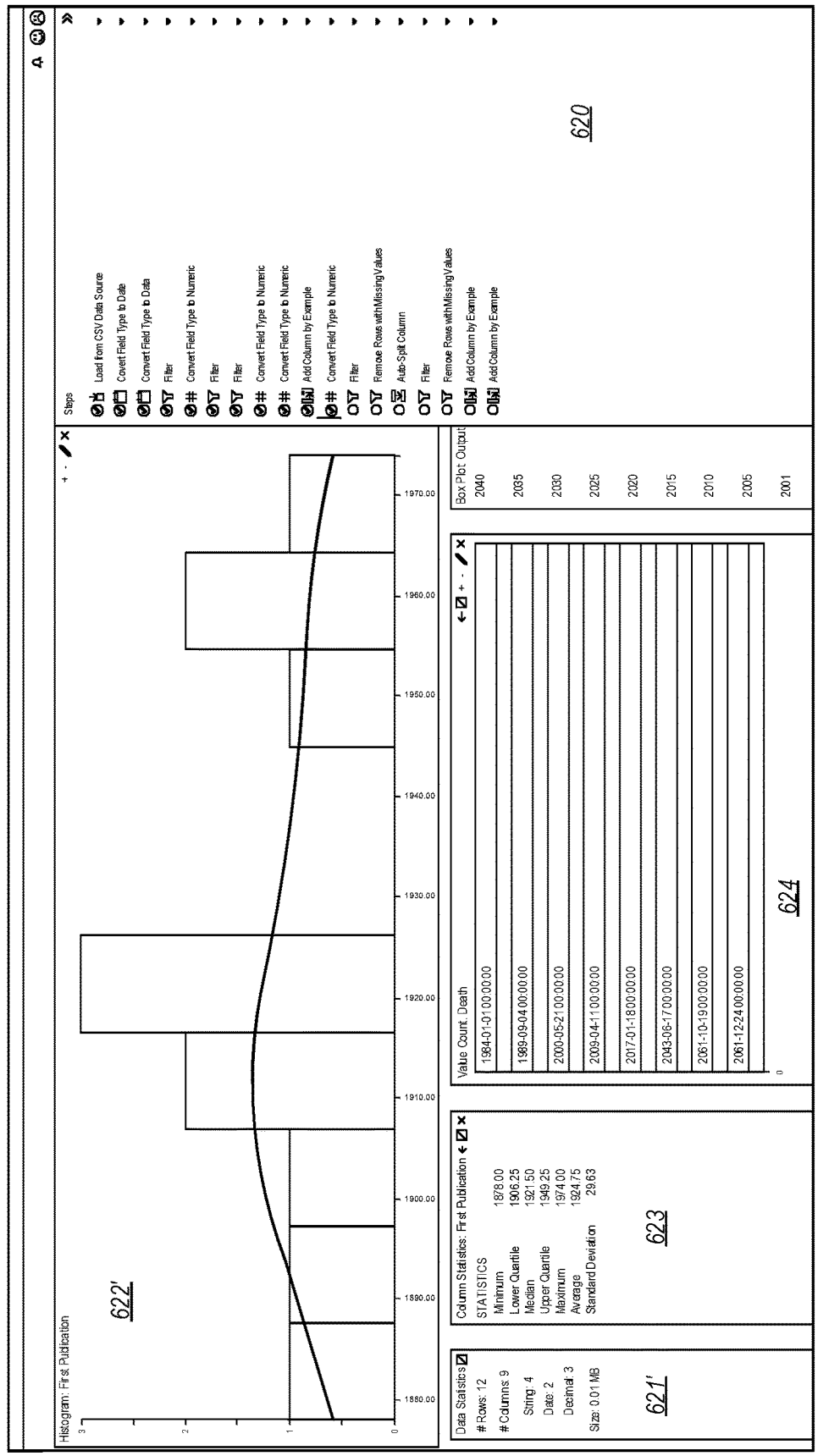

FIG. 12 illustrates the user interface 1200 which shows how the user interface 1100 of FIG. 11 changes if the user uses the navigation pane 620 to navigate to the eleventh stage of operation, which again converts field types to a numeric field type (after having added a column by example in the tenth stage), causing the underlying data set to change, which change propagates through all views, just as in all other stages. Now, suppose that the user selects a promotion control 1201 of the Histogram view 622. This results in the user interface 1300 of FIG. 13.

The promoted histogram view 622' is shown now in the larger pane, and thus shows further detail. The promotion control has now been removed from the histogram view 622' since that view is already promoted. Meanwhile, the histogram user interface component 622 has changed to a data statistics user interface view 621', now occupying the smaller pane.

Figure 14:
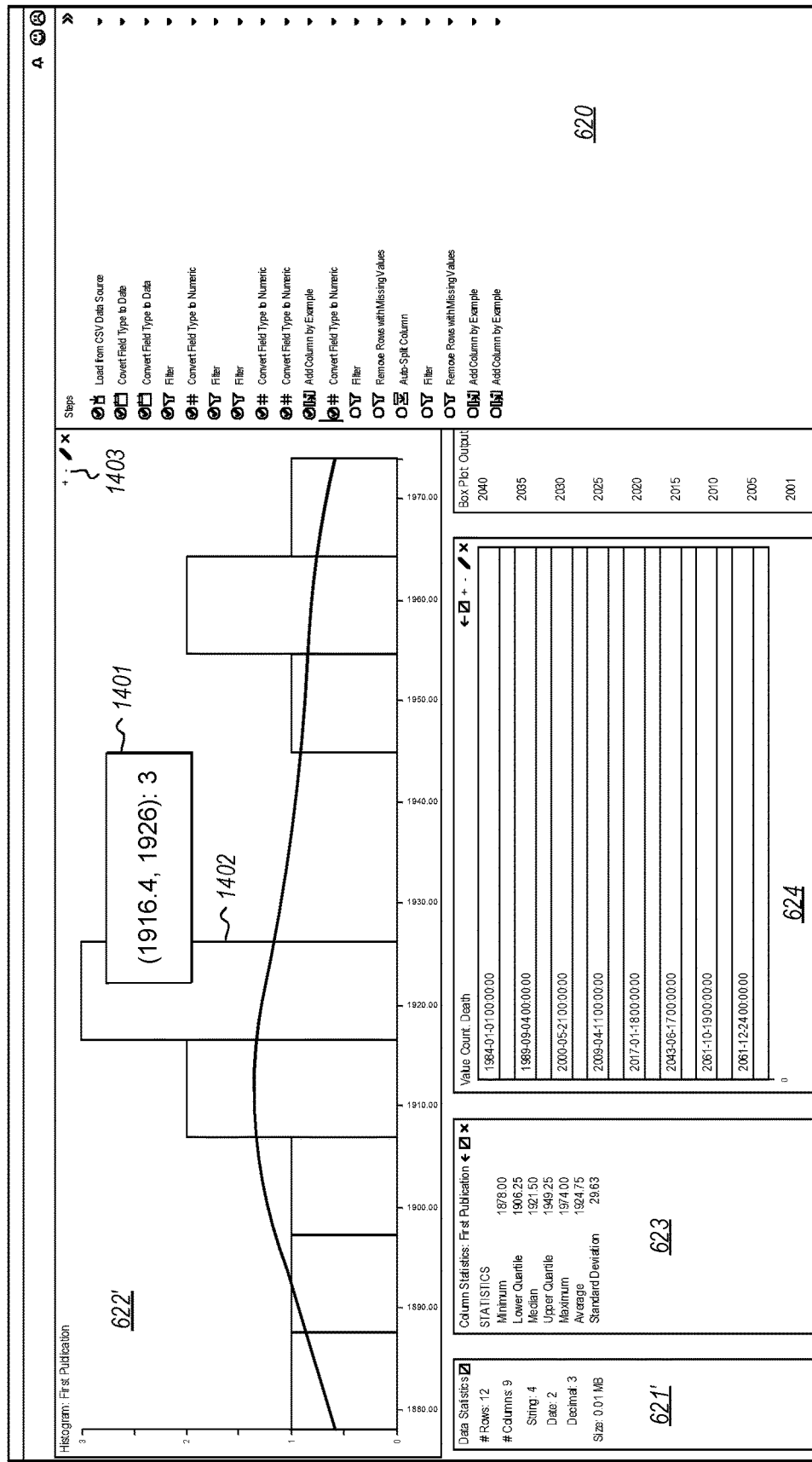

At this stage, even though this represents a prior stage in the data preparation, the user may select a different bar 1422 in the bar-chart view 1402 of FIG. 14. This causes underlying summary values of that selected portion to be shown without the popup box 1401. The user may then select to go in a different data preparation direction, by filtering on that newly selected portion (by selecting the filter control 1403).

Figure 15:
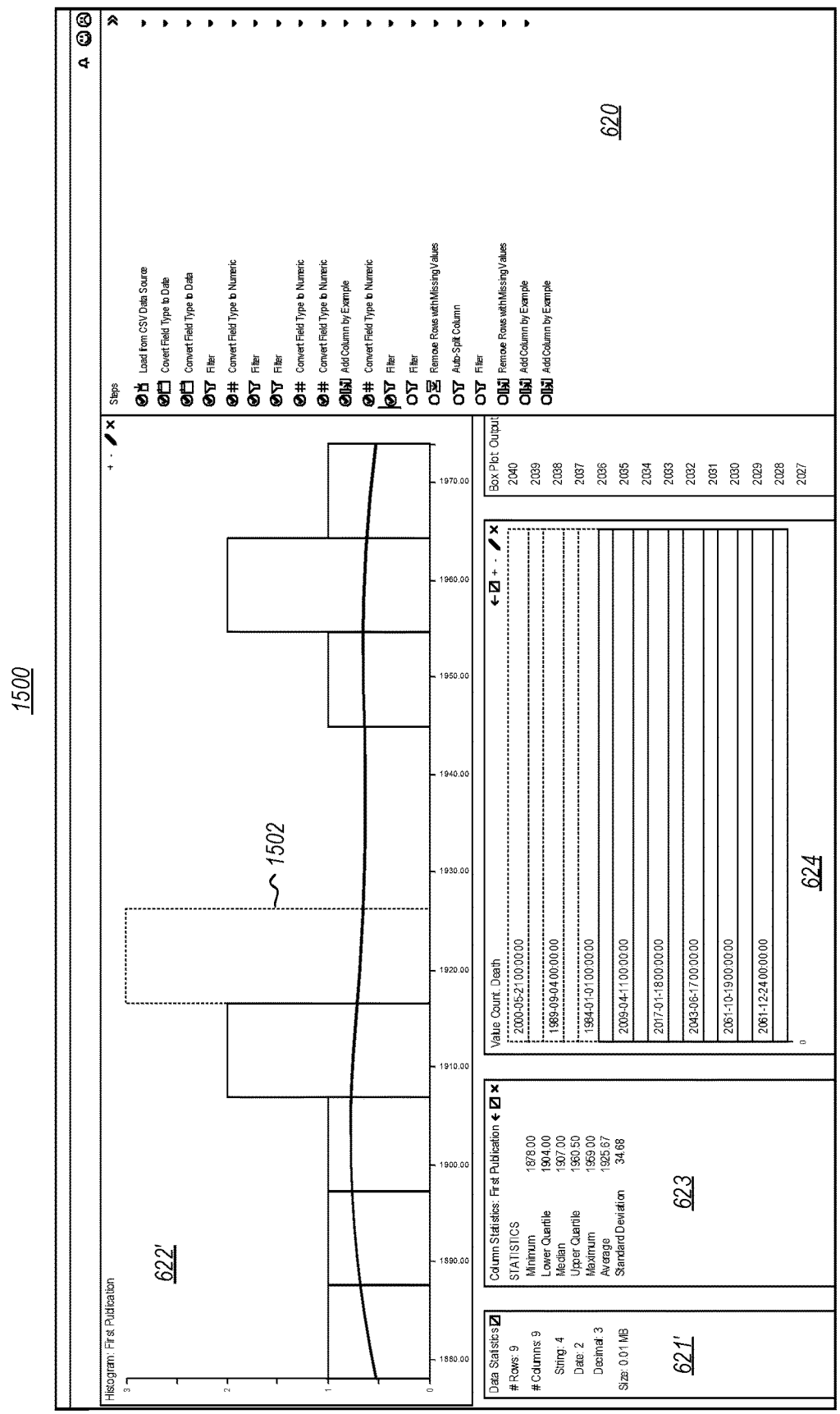

FIG. 15 illustrates the user interface 1500 after this filtering has been performed, which caused changes to the content to the data statistics view 621' and the column statistics view, and caused the three entries (the top three) in the value count view 624 corresponding to the selected bar to be highlighted.

Figure 16:
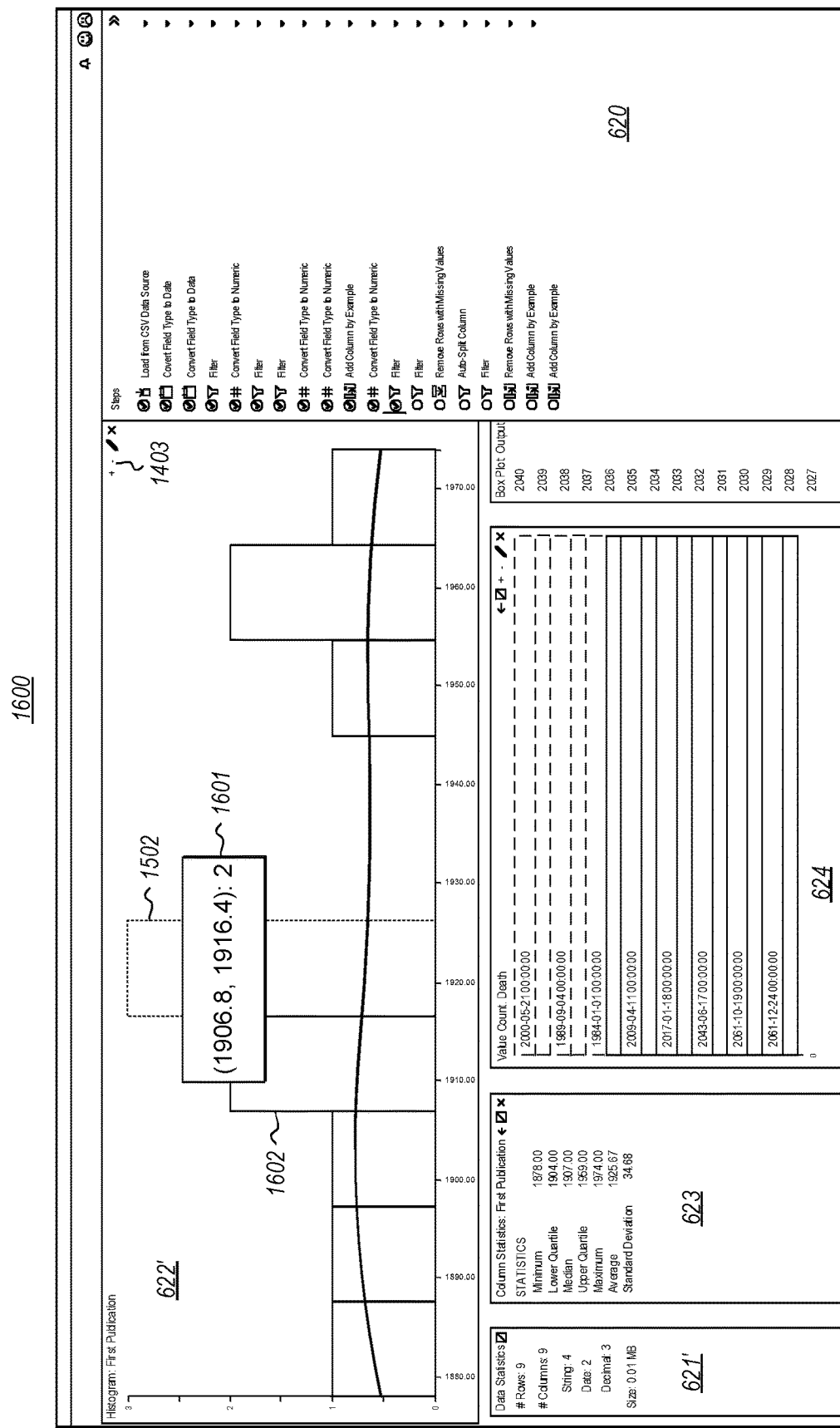
Figure 17:
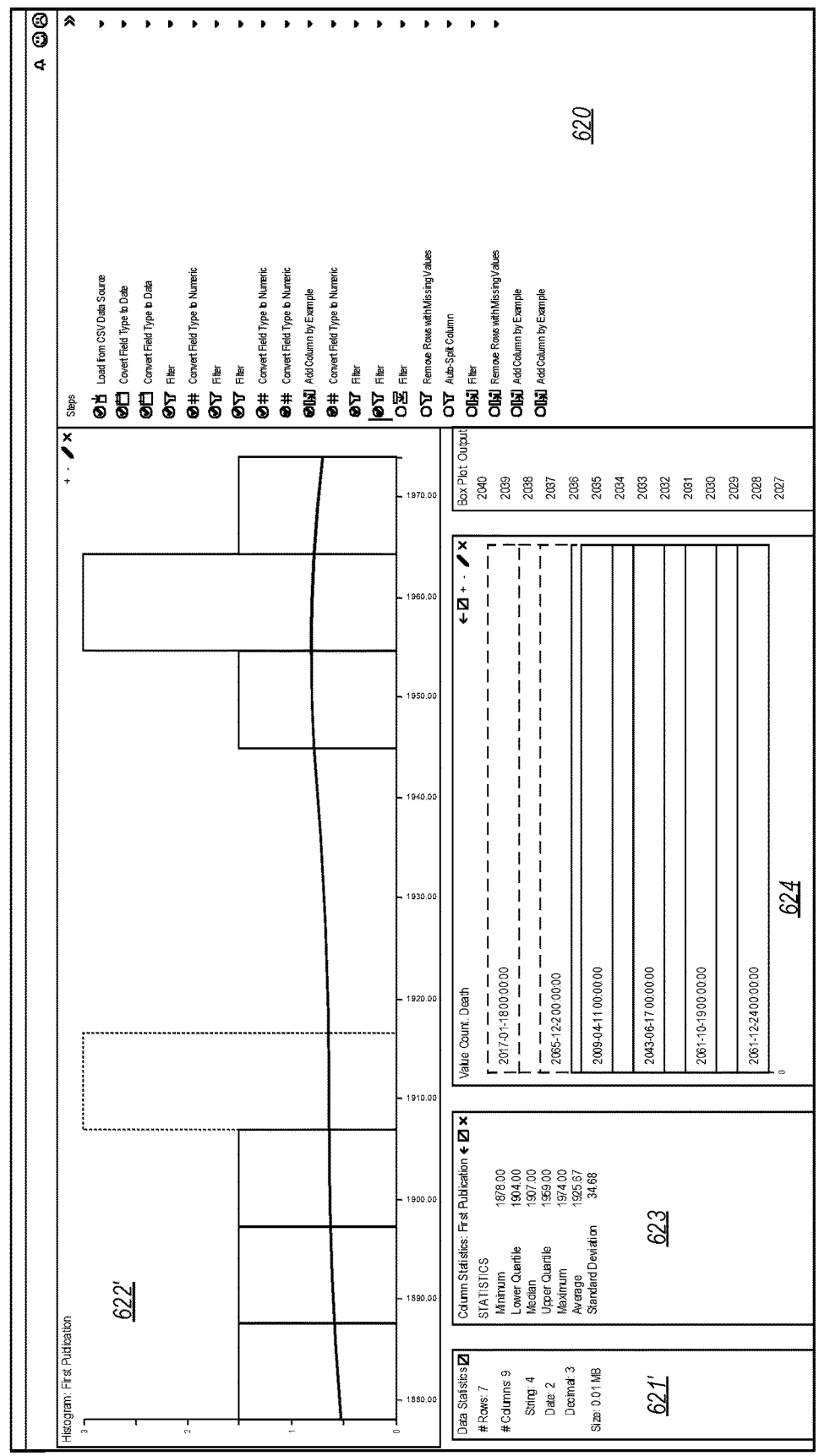
Figure 18:
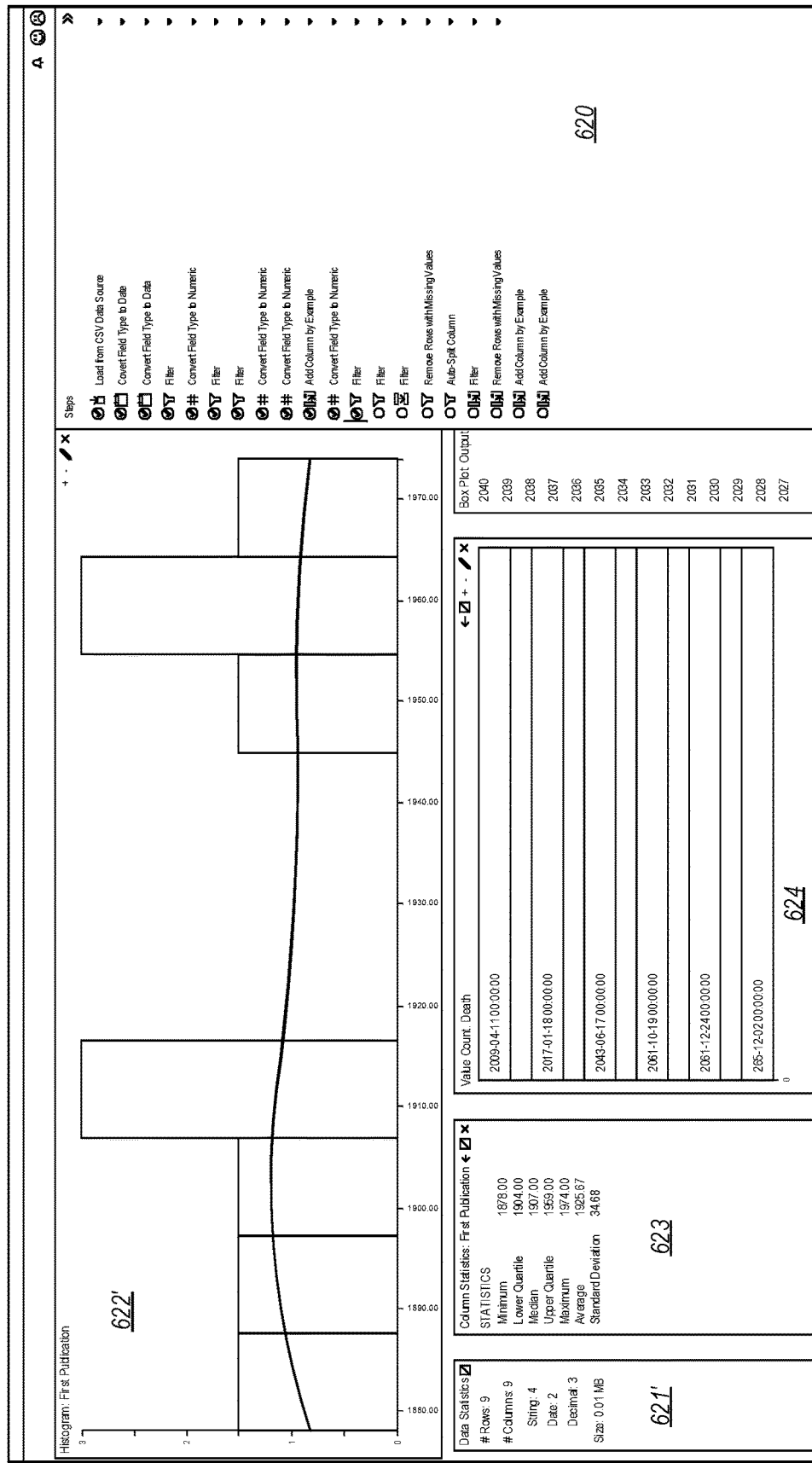

FIG. 16 illustrates the user interface after the user selects another bar 1602 of the bar chart view 622', causing a new detail popup to appear. The user may then select to filter on that newly selected portion (using the filter control 1403), causing the user interface 1700 of FIG. 17 to appear. FIG. 18 illustrates a user interface 1800 in which the user navigates to the prior filtering stage.

Accordingly, a user interface has been described that includes multiple components that each provide a view on the underlying data set, and also provide controls for editing or preparing the data set. The user interface components include a detail user interface component that displays a detail view on the data set, and one or more summary user interface components that each display a corresponding summary view on the data set. There is also a control that promotes a summary view on the data set to a detailed view on the data set, and corresponding changes the controls usable in the promoted detail view. This allows the user to have a wide variety of views on the data set, and corresponding controls appropriate for that view. Thus, the user can take the most efficient and intuitive approach to editing or preparing the data, thereby allowing data preparation to be more efficient, intuitive and likely correct.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
   one or more processor(s); and
   one or more computer-readable media having stored thereon computer-executable instructions that are executable by the one or more processor(s) to cause the computing system to display a user interface comprising:
      a plurality of user interface components, each user interface component concurrently displaying a different view of a data set, each of at least some of the different views having one or more control(s) that are used to interact with the data set, the plurality of user interface components comprising at least:
         a detail user interface component that displays a detail view of the data set according to a present version of the data set; and
         one or more summary user interface component(s) that each display a different summary view of the present version of the data set, wherein at least one of the detail user interface component or one of the one or more summary user interface component(s) further comprises:
            a navigation control that, when selected, causes the respective component to display a particular prior version of the data set without returning the data set itself to the particular prior version; and
            an undo control that, when selected, causes the respective component to display a previous version of the data set and to return the data set itself to the previous version such that the detail user interface component and the one or more summary user interface component(s) each display the previous version of the data set; and
         a promotion control that is associated with a visualization of particular data included among the data set, the promotion control, when activated, causing the particular data's visualization to be promoted from being visualized as a summary view displayed in a summary user interface component to being visualized as a detail view displayed in the detail user interface component,
            wherein selection of the promotion control further causes a change to be made from a set of one or more controls presented in the summary view to a new set of one or more controls usable in the promoted detail view,
            wherein, in addition to promoting the particular data's visualization, selection of the promotion control while the particular data's visualization is visualized as the summary view additionally causes the promotion control to be removed when the particular data's visualization is subsequently visualized as the detail view such that the promotion control is displayed only when the summary view is displayed and the promotion control is not displayed when the detail view is displayed, and
            wherein a set of promotion rules are maintained to determine how the particular data's visualization is to be promoted from being visualized as the summary view to being visualized as the detail view, the promotion rules being dependent on historical data identifying preferences of one or more users.

2. The computing system in accordance with claim 1, wherein interacting with the data set comprises the one or more control(s) being used to prepare the data set.

3. The computing system in accordance with claim 2, wherein preparing the data set includes removal of data from the data set.

4. The computing system in accordance with claim 2, wherein preparing the data set includes changing a format of data included within the data set.

5. The computing system in accordance with claim 1, wherein promoting the particular data's visualization causes the detail view to be created based on a predetermined detailed view type within the detail user interface component.

6. The computing system in accordance with claim 5, the predetermined detailed view type depending on a summary view type of the summary view that was promoted.

7. The computing system in accordance with claim 5, the predetermined detailed view type being a default detailed view type at least for a summary view type of the summary view.

8. The computing system in accordance with claim 5, the predetermined detailed view type being dependent on user configuration.

9. The computing system in accordance with claim 1, the detail user interface component capable of stacking multiple detail views so as to display on top a most recently accessed detail view.

10. The computing system in accordance with claim 9, the user interface further comprising:
   a control for exposing on top of the detail user interface component a newly-exposed detail view of the multiple stacked detail views that was not previously on the top of the detail user interface component.

11. The computing system in accordance with claim 10, wherein when the newly-exposed detail view is exposed in the detail user interface control, at least one summary views of the one or more summary user interface component(s) also changes to correspond to the newly-exposed detail view.

12. The computing system in accordance with claim 10, the control for exposing comprising a minimize control that minimizes a previously-exposed detail view that was on the top of the detail user interface component to expose an immediately underlying detail view in the detail user interface component.

13. The computing system in accordance with claim 10, the control for exposing comprises a close control that closes a previously-exposed detail view that was on top of the detail user interface component to expose an immediately underlying detail view in the detail user interface component.

14. The computing system in accordance with claim 1, wherein an amount of detail displayed in the summary view for the particular data is less than an amount of detail displayed in the detail view for the particular data such that further details are provided for the particular data when the promotion control is activated.

15. The computing system in accordance with claim 14, wherein the particular data's visualization is a histogram of the particular data, and wherein a horizontal axis of the visualization when the visualization is displayed as the summary view includes less information than when the visualization is displayed as the detail view.

16. The computing system in accordance with claim 1, wherein the one or more summary user interface component(s) include a plurality of summary user interface components, and wherein a separate promotion control is provided for each summary user interface component included among the plurality of summary user interface components such that a plurality of promotion controls are displayed, and wherein the plurality of promotion controls are displayed simultaneously with one another on the user interface.

17. A method for causing a user interface to be displayed on a display of a computing system, the method comprising:
    causing a plurality of user interface components to be concurrently displayed at the user interface such that each user interface component displays a different view of a data set, the plurality of user interface components comprising at least:
        a detail user interface component that displays a detail view of the data set;
        a plurality of summary user interface components that each display a corresponding summary view of the data set, each of at least some of the summary views having one or more control(s),
        wherein at least one of the detail user interface component or the plurality of summary user interface components displays a present version of the data set while at least one other of the detail user interface component or the plurality of summary user interface components simultaneously displays a view of a prior version of the data set; and
        a promotion control that is associated with a visualization of particular data included among the data set, the promotion control, when activated, causing the particular data's visualization to be promoted from being visualized as a summary view displayed in a particular one of the plurality of summary user interface components to being visualized as a detail view displayed in the detail user interface component,
    wherein, in addition to promoting the particular data's visualization, selection of the promotion control while the particular data's visualization is visualized as the summary view additionally causes the promotion control to be removed when the particular data's visualization is subsequently visualized as the detail view such that the promotion control is displayed only when the summary view is displayed and the promotion control is not displayed when the detail view is displayed, and
    wherein a set of promotion rules are maintained to determine how the particular data's visualization is to be promoted from being visualized as the summary view to being visualized as the detail view, the promotion rules being dependent on historical data identifying preferences of one or more users.

18. A computer program product comprising one or more computer-readable storage media having stored thereon computer-executable instructions that are structured such that, when executed by one or more processor(s) of a computing system, cause the computing system to at least:
    cause a plurality of user interface components to be simultaneously displayed at a user interface, each of the plurality of user interface components displaying a different view of a data set, including at least:
        a detail user interface component that displays a detail view of a present version of the data set;
        a plurality of summary user interface component(s) that each display a corresponding summary view on the data set simultaneously with the detail user interface component, each of at least some of the summary views having one or more control(s), wherein at least one of the plurality of summary user interface component(s) displays the data set according to a prior version of the data set that differs from the present version of the data set; and
        a promotion control that is associated with a visualization of particular data included among the data set, the promotion control, when activated, causing the particular data's visualization to be promoted from being visualized as a summary view displayed in a particular one of the plurality of summary user interface components to being visualized as a particular detail view displayed in the detail user interface component,
    wherein, in addition to promoting the particular data's visualization, selection of the promotion control while the particular data's visualization is visualized as the summary view additionally causes the promotion control to be removed when the particular data's visualization is subsequently visualized as the particular detail view such that the promotion control is displayed only when the summary view is displayed and the promotion control is not displayed when the particular detail view is displayed, and
    wherein a set of promotion rules are maintained to determine how the particular data's visualization is to be promoted from being visualized as the summary view to being visualized as the particular detail view, the promotion rules being dependent on historical data identifying preferences of one or more users; and causing the data set to be altered in response to detection of user interaction with the at least one summary user interface component displaying the prior version of the data set, the alteration comprising at least returning the present version of the data set to the prior version of the data set such that the detail user interface component is subsequently caused to display a corresponding detail view of the prior version of the data set and the at least one summary user interface component is caused to display the prior version of the data set.

* * * * *